Aug. 21, 1951 D. S. WILLSON 2,565,287
WABBLE PLATE FOR NUTATING TYPE FLUID METERS
Original Filed March 2, 1946 5 Sheets-Sheet 1

Inventor:
David S. Willson,
By James E. Vair
Attorney.

Aug. 21, 1951     D. S. WILLSON     2,565,287
WABBLE PLATE FOR NUTATING TYPE FLUID METERS
Original Filed March 2, 1946     5 Sheets-Sheet 2

Inventor:
David S. Willson,
By [signature]
Attorney.

Aug. 21, 1951 D. S. WILLSON 2,565,287
WABBLE PLATE FOR NUTATING TYPE FLUID METERS
Original Filed March 2, 1946 5 Sheets-Sheet 3

Inventor:
David S. Willson,
By [signature]
Attorney.

Aug. 21, 1951 D. S. WILLSON 2,565,287
WABBLE PLATE FOR NUTATING TYPE FLUID METERS
Original Filed March 2, 1946 5 Sheets-Sheet 4

Inventor
David S. Willson,
By [signature]
Attorney

Patented Aug. 21, 1951

2,565,287

UNITED STATES PATENT OFFICE 2,565,287

WABBLE PLATE FOR NUTATING TYPE FLUID METERS

David S. Willson, Muskegon Heights, Mich., assignor to John Wood Manufacturing Company, Inc., Philadelphia, Pa., a corporation of Delaware Original application March 2, 1946, Serial No. 651,447. Divided and this application June 9, 1947, Serial No. 753,527

1 Claim. (Cl. 74—60)

My invention relates to improvement in wabble plate for nutating type fluid meters of the positive displacement type which are particularly adaptable for use in dispensing apparatus which measures accurately the volume of fluid dispensed. My improved meter is also adaptable for other uses, such as for installation in a pipeline to measure accurately the volume of fluid flowing under pressure through the pipeline, etc.

This application is a division of my application Serial No. 651,447 filed March 2, 1946, for Improvement in Fluid Meters, which matured into Letters Patent No. 2,437,413 granted March 9, 1948.

One object of my invention is to provide a fluid meter which has a die cast body and top cover of small overall dimensions, but which has the same volumetric metering capacity as a larger dimensioned fluid meter constructed in the ordinary manner.

Another object of my invention is to provide a fluid meter in which the wabble plate is continuously maintained in timed relation with respect to the timing of the valve of the meter.

My invention includes the various novel features of construction, arrangement, and method of operation as hereinafter described.

In said drawings; Fig. 1 is a top plan view of my improved meter.

Figure 1:
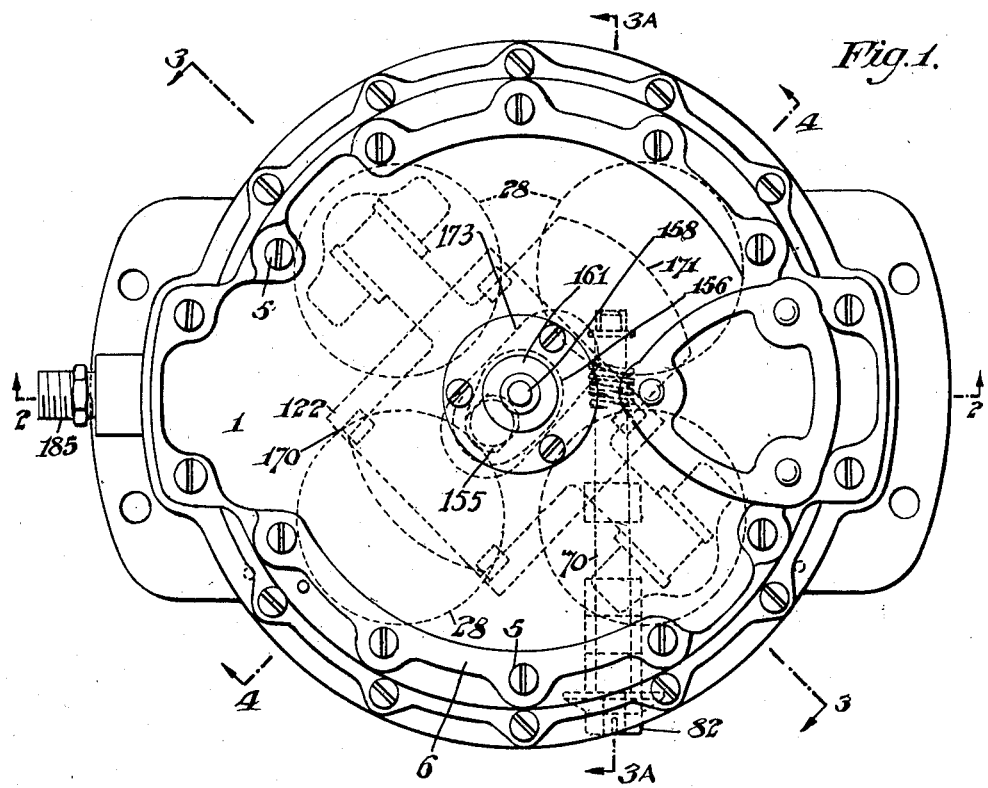

Referring to said drawings; my improved meter is conveniently formed in three parts comprising a die cast top cover 1, a die cast main body casing 2, and base portion, or bottom closure 3, which may also be die cast, if desired. Said top cover 1 is rigidly connected to the body casing 2 by means of a circumferential series of screws 5 which extend through openings in the flange 6 of the top cover 1 into matching screw threaded holes formed in the top wall of the body casing 2. A gasket 9 is interposed between the top cover 1 and the body casing 2 in order to maintain said top 1 and body casing 2 in fluid tight relationship. The bottom closure 3 is rigidly connected to the body casing 2 by means of a circumferential series of screws 10 which extend through openings in the flange 12 of the body casing 2 into matching screw threaded holes formed in the flange 13 of the bottom closure 3. A gasket 15 is interposed between the bottom closure 3 and body casing 2 to maintain said bottom closure 3 and body casing 2 in fluid tight relationship.

Said bottom closure 3 is provided with the fluid inlet connection 16 which is in open communication with the inlet opening 16a formed in the bottom closure. The inlet opening 16a is in registry with the inlet passageway 17 formed in the body casing 2, and the inlet passageway 17 is in open communication with the inlet chamber 18 formed in the top cover 1. The inlet connection 16 is adapted to be connected to a source of fluid under pressure which is measured as it passes through the meter. For example, my improved meter may be mounted on an air eliminator chamber of a liquid dispensing apparatus such as disclosed in Letters Patent of the United States No. 2,351,331, granted to M. J. Goldberg, with the meter inlet 16 disclosed herein connected to the air eliminator outlet opening 26 of said patent. The air vent connection 185 disclosed herein would be substituted for the connection 30' of said patent.

I find it convenient to form the valve seat 23 as a separate flat plate which is integrally locked in the top wall 24 of the body casing 2 when said body casing 2 is die cast. It is obvious that said valve seat may be formed otherwise, for example, as a part of, or connected to, the top wall 24 of the body casing. Said valve plate 23 is provided with a series of port openings 26 which are in registry with openings 27 formed in the top wall 24 of the body casing 2. The openings 27 are larger than the openings 26 and, hence, the effective port area conveniently is determined by the configuration and area of the accurately formed ports 26 in the valve plate 23. Each port 26 is in open communication with its piston cylinder 28. I find it convenient to form said piston cylinders 28 as open end cylinders which are screw threaded at their upper ends and engage threaded openings 29 formed at the top of the body casing 2.

Although I have illustrated my invention with reference to a 4-piston cylinder type of meter, it is obvious that the number of piston cylinders used is optional; and although I have shown and described the piston cylinders 28 in screw threaded engagement in the top of the body casing 2, it is obvious that said cylinders may be connected otherwise.

Figures 3, 6:
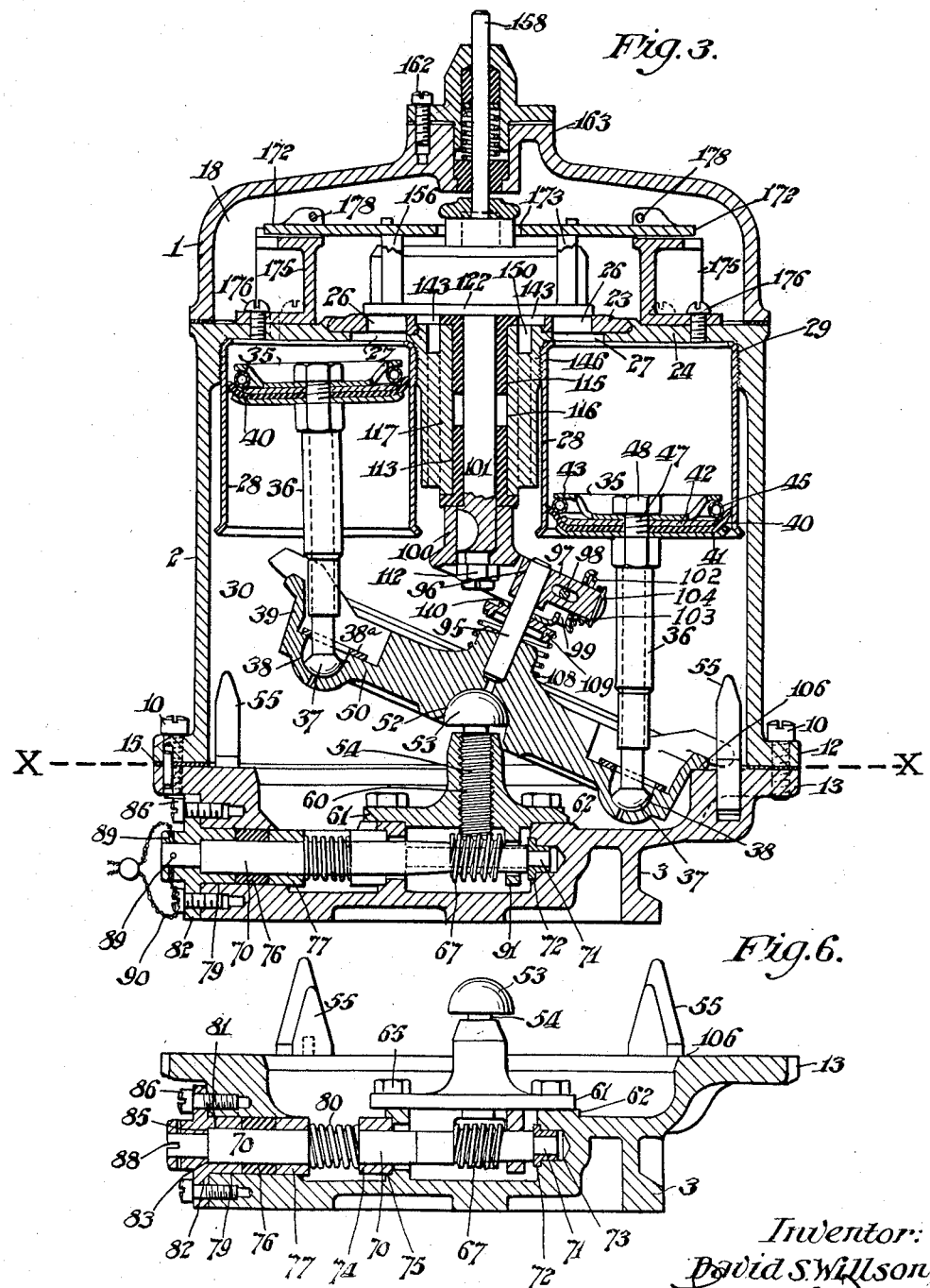
Fig. 3 is a vertical sectional view, partly in elevation, with the structure shown above the line X—X being taken on the line 3—3 in Fig. 1, and the structure shown below the line X—X being taken on the line 3A—3A in Fig. 1.
Fig. 6 is a vertical sectional view, partly in elevation, of the bottom closure shown in Fig. 7, and taken on the lines 8—8 in Fig. 5.
Figure 5:
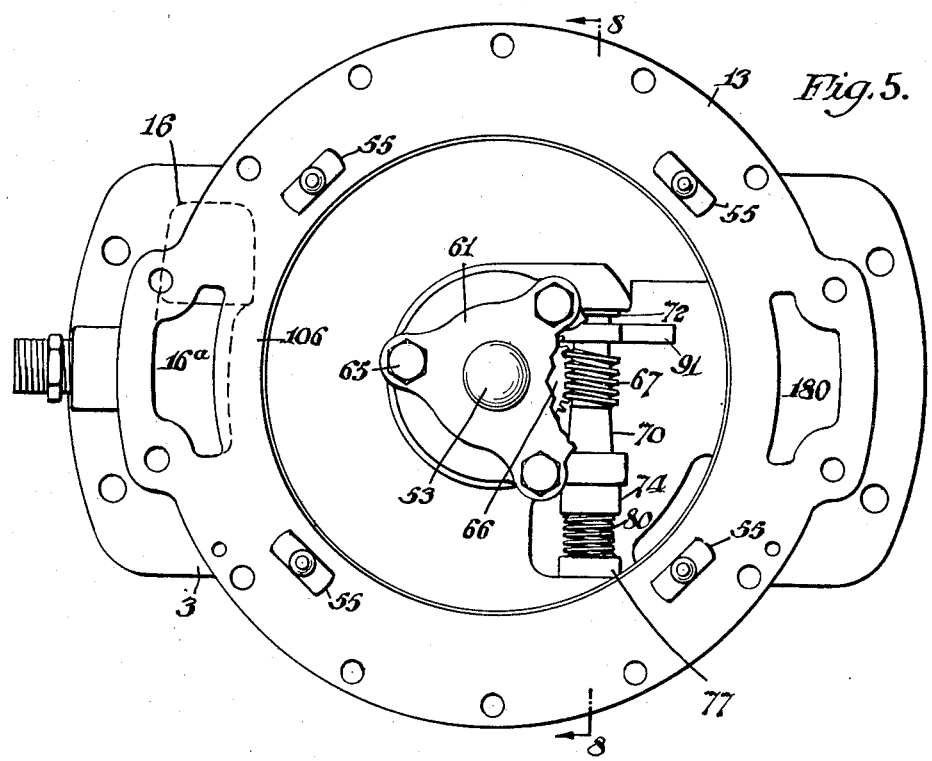
Fig. 5 is a top plan view of the bottom closure of the meter.
Figure 8:
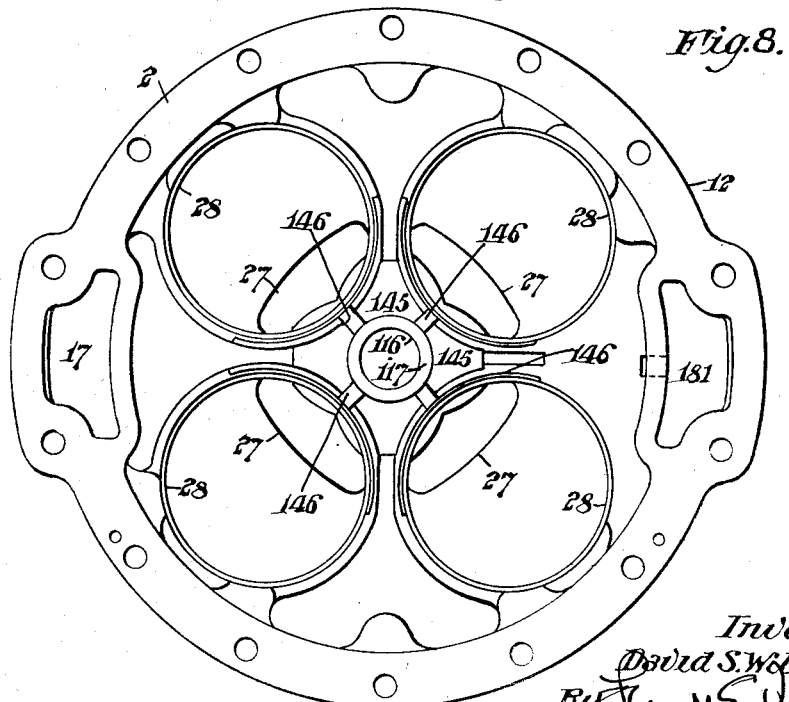
Fig. 8 is an inverted bottom plan view of the main body casing of the meter shown in Fig. 3.

As best shown in Fig. 3, each of the cylinders 28 is provided with a piston assembly 35 which is mounted in a cylinder 28 for reciprocation in response to the fluid pressure on top of the piston. Each piston assembly 35 includes a telescopic connecting rod 36 provided at its lowermost end, as viewed in Fig. 3, with a ball end 37 which is mounted and confined in a socket 38 formed in the wabble plate 39. The connecting rod ball end 37 is retained in its socket 38 conveniently by means of a washer 38ª which is fastened to the wabble plate by any well known means, such as by providing the washer with ears which extend through holes in the wabble plate, with the ears clinched over on the under side of the wabble plate. The telescopic piston rod herein shown is claimed in my copending application Serial No. 584,720, filed March 24, 1945, now abandoned, for Improvement in Connecting Rods. Although I have shown the sockets 38 formed as an integral part of the wabble plate 39, it is obvious that said sockets may be formed as separate stampings inserted into openings formed in said wabble plate, as is well known in the art.

Each piston assembly 35 includes a cup leather 40, piston backing plate 41, intermediate plate 42, piston spring retainer plate 43, and piston expander spring 45. Each piston assembly 35 is mounted on the screw threaded reduced portion 47 of its piston rod 36 and maintained in rigid position on its piston rod 36 by means of a nut 48. The piston assembly shown and described is of a well known construction wherein a piston expander spring is adapted to maintain the upturned edge of the cup leather in continuous frictional engagement with the side wall of the cylinder 28.

Figure 9:
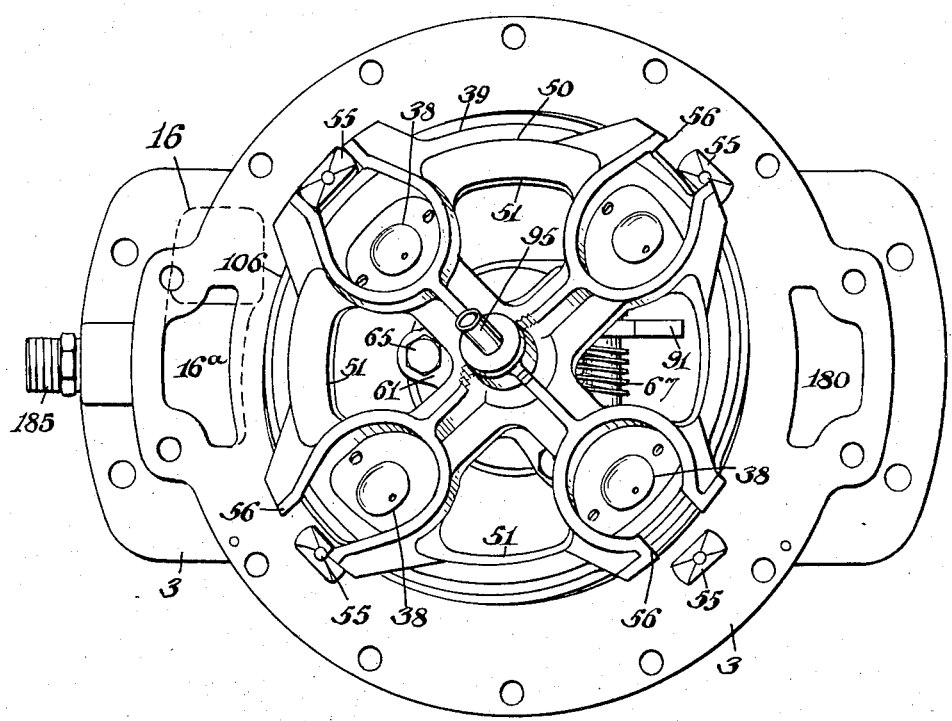
Fig. 9 is a plan view of the bottom closure, similar to Fig. 5, but with the wabble plate of the meter superimposed in position on the adjusting screw mounted in the bottom closure.

The web 50 of the wabble plate 39 is formed conveniently as a spider and includes a series of openings 51 in spaced relation to the series of sockets 38 which are formed in enlarged portions in the spider arms of the wabble plate 39, as best shown in Fig. 9. Said openings 51 are formed in the wabble plate merely to lessen the weight thereof. The wabble plate 39 is provided with the socket 52 and said wabble plate 39 is concentrically mounted in the chamber 30 on the hemispherically shaped ball end 53 of the adjusting screw 54.

As best shown in Figs. 3, 5, 6, and 9, rotation of the wabble plate 39 is prevented by means of a series of stabilizing guide pins 55 which are adapted to be engaged and disengaged in their respective notched openings 56 formed in the outer periphery of the wabble plate 39. Although I have shown said stabilizing guide pins 55 formed as separate elements inserted in openings in the bottom closure 3, it is obvious that said guide pins 55 may be formed as an integral part of said bottom closure 3. Said stabilizing guide pins 55 are formed with conical bearing surfaces for engagement in the openings 56 formed in the wabble plate. It is to be noted that the stabilizing guide pins 55 are located outside of the wabble plate track 106 which permits greater tolerances to be allowed in manufacture than would be possible if the pins were positioned inside of the wabble plate track in holes formed in the wabble plate. For equivalent accuracy and timing of the valve, closer tolerances are required where the pins for a wabble plate are located closer to the center of motion of the wabble plate. It also is to be noted that ordinarily it is more economical to mill open end slots 56 such as are formed in the wabble plate 39 than it is to finish slotted openings within a wabble plate, as used in meters of prior art constructions.

The adjusting screw 54 is engaged in the screw threaded opening 60 formed in the support bracket 61 which is rigidly mounted on the shoulder 62, formed as an integral part of the bottom closure 3, by means of cap screws 65. The lower end of the adjusting screw 54 is provided with the gear 66 in rigid relationship therewith. The gear 66 is in engagement with the worm 67 rigidly fixed to, or formed on, the adjusting shaft 70. Although I have shown a gear and worm gear as the driving connection because a finer calibration adjustment may be effected therewith, it is obvious that other forms of gears, such as bevelled gears, may be used.

As best shown in Figs. 3 and 6, the right-hand end portion 71 of the adjusting shaft 70 is journalled in the bearing 72 which is press fitted in the opening 73 formed in the bottom closure 3. The shaft 70 is journalled intermediately in the bearing 74 which is free fitted in an opening 75 formed in the shoulder 62. The shaft 70 is provided with a stuffing box comprised of the packing 76 and pressure collar 77 which are mounted in an opening 79 formed in the bottom closure 3. The collar 77 is mounted with freedom of axial movement in said opening 79 and said collar 77 is stressed against the packing 76 by means of the spring 80 which encircles the shaft 70 and is interposed between the bearing 74 and the collar 77.

Referring to Figs. 3 and 6; the left-hand end of the adjusting shaft 70 is mounted with freedom of turning movement in the bearing socket opening 81 formed in the closure seal plate 82. Axial movement to the left of said shaft 70 is prevented by the shoulder 83, formed on the shaft 70, engaging the offset 85 formed in said socket opening 81 of the seal plate 82. Said seal plate 82 is rigidly connected to the bottom closure 3 by means of screws 86 which extend through openings formed in said plate 82 into screw threaded openings in said bottom closure 3.

The outer end of the shaft 70 is provided with the screw driver slot 88 so that turning movement of said shaft may be effected conveniently by means of a screw driver inserted in said slot 88. The seal plate 82 is provided with a series of small drilled openings 89 to permit a seal wire 90 to be passed therethrough and through the slot 88 to prevent unauthorized turning movement of the adjusting shaft to effect a change in the calibration of the meter after it has been inspected and sealed by the weights and measures authorities.

I find it convenient to provide the support bracket 61 with the ear 91 which has an opening which encircles the shaft 70. Such construction prevent unauthorized change of the meter adjustment without a breaking of the seal wire 90 if the cap screws 65 of the support bracket 61 be removed, because the ear 91, encircling the shaft 70, would prevent disengagement of the gear 66 from the worm 67.

As best shown in Fig. 3; the wabble plate 39 is provided with the drive stem shaft 95 which is journalled in the drilled opening 96 formed in the driving block assembly 97 of the crank arm driving block assembly. Said driving block assembly 97 is mounted with freedom of pivotal movement on the crank arm pin 98, the opposite ends of which are held in the bifurcated crank arms 99 (only one of which is shown in Fig. 3) formed on the crank arm 100 rigidly connected to the lower end of the crank shaft 101. Said pin 98 extends through an elongated opening formed in said driving block 97, and, accordingly, said driving block 97 is thus mounted with freedom of both pivotal and reciprocatory movement in its sliding engagement within the bifurcated crank arms 99. Reciprocatory movement of the driving block 97 is limited by the pin 98 coming into engagement with either end of the elongated opening in the driving block. The driving block 97 is provided with the spring 102 held between the inner cup washer 103, in engagement with the ends of the bifurcated crank arms 99, and the outer washer 104 be rigidly mounted on the right-hand end of the driving block 97 by means of a screw. Such a construction places a loading on the wabble plate stem shaft 95 substantially at right angles to the axis of said stem shaft 95, with the result that all of the forces of the spring 102 act to hold the wabble plate 39 on the wabble plate track 106 formed on the upper side of the bottom closure 3, as viewed in Fig. 3.

The wabble plate 39 is provided with the spring 108, the lower end of which encircles an offset formed at the top of the wabble plate 39. The upper end of said spring 108 is in engagement with the wabble plate bearing washer 109. The thrust washer 110 is interposed between the wabble plate bearing washer 109 and the bottom surface of the bifurcated arms 99. Said thrust washer 110 is provided with an upturned portion which is engaged with freedom of movement between the bifurcated arms 99, as best shown in Fig. 3. The crank arm and driving block assembly herein described is claimed in my copending application Serial No. 601,180 filed June 23, 1945, now Patent No. 2,451,455.

Figure 4:
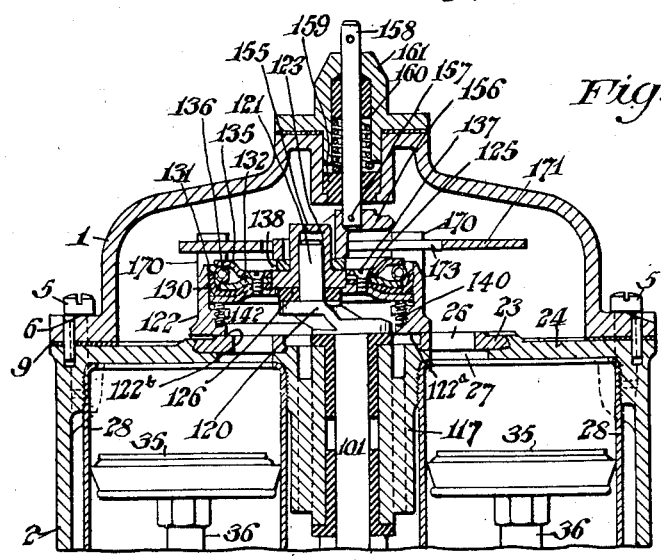
Fig. 4 is a fragmentary vertical sectional view taken on the line 4—4 in Fig. 1.

The crank arm 100 is rigidly connected to the reduced lower end portion of the crank arm 101 by means of the nut 112. Said crank arm 101 is journalled in thrust bearings 113 and 115 which are press fitted in the opening 116 of the central hub bearing 117, which is formed as an integral part of the main body casing 2. As shown in Fig. 4, the crank shaft 101 is provided at its upper end, in integral relationship therewith, with the crank arm 120 and crank pin 121. The crank shaft 101 rotates in a clockwise direction, as viewed in Fig. 1, and it is to be noted that the crank arm 100 is fastened to said crank shaft 101 so that the arms 99 are in a position substantially 90° clockwise from the crank pin 121 which drives the meter valve 122.

Figure 10:
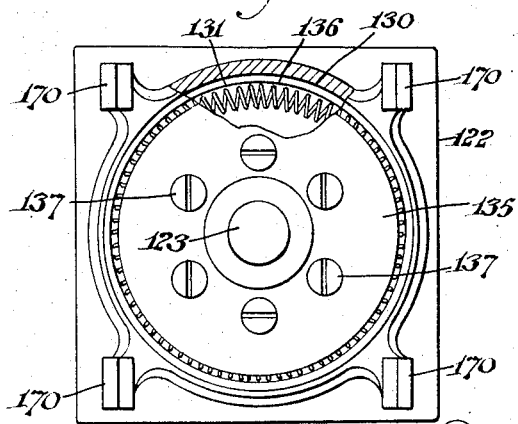
Fig. 10 is a top plan view, partly in section, of the meter valve indicated in Figs. 3 and 4.

As best shown in Fig. 4, the crank pin 121 is journalled in the bearing 123 formed in the imperforate inner section 125 of the valve 122. The friction thrust washer 126 is mounted on the pin 121 and interposed between the crank arm 120 and the bearing surface of the inner section 125. As best shown in Figs. 4 and 10; the valve is comprised of the solid outer valve portion 122 and the imperforate inner portion 125. Said inner portion 125 is circular and is slidably fitted in telescopic relation in an annular recess 130 formed in the outer valve section 122. Said inner section 125 includes a cup leather 131, an intermediate plate 132, a spring retainer plate 135 and cup leather expander spring 136. The cup leather 131, intermediate plate 132, and spring retainer plate 135 are assembled together and secured to the upper surface of the lower annular flange of the inner section 125 by means of a series of screws 137 which extend through matching openings formed in said spring retainer plate 135, intermediate plate 132, and cup leather 131 into matching screw threaded holes formed in said annular flange of the innersection 125. The expander spring 136 maintains the upturned edge of the cup leather 131 in continuous fluid tight engagement with the wall of the annular recess 130 of the outer valve section 122. The valve construction shown and described herein is described and claimed in my copending divisional application Serial No. 753,528, filed June 9, 1947, now abandoned.

When the meter is operating under liquid pressure, the outer valve section 122 is pressed downwardly by a series of springs 140 positioned between the outer valve section 122 and the inner section 125, as best shown in Fig. 4, so that the valve seating surface 122a seats on the valve seat 23. Although in Fig. 4 I have shown only the two springs 140 which come in the plane of section, I find it convenient to utilize a plurality of such springs. The lower ends of said springs 140 are engaged in openings formed in the internal annular flange of the valve section 122, and the upper ends of said springs 140 bear against the underside of the annular flange of the inner section 125. When the meter is standing idle, the upward stress against the inner section 125 is transmitted through the thrust washer 138, the upper surface of which bears against the drive shaft arm 156, which in turn may push the drive shaft 158 upwardly slightly until the upper surface of the drive shaft arm 156 comes into contact with the lower surface of the bearing 159. Thus, it will be noted that the vertical spaced relationship of the outer valve section 122 and the inner valve section 125 is maintained.

The chamber 142, formed of the annular recess in the valve section 122 and closed at the top by the inner valve section 125, is in continuous open communication with the chamber 30 through the outlet ports 143 formed in the valve plate 23. Said outlet ports 143 are in registry with the outlet ports 145 formed around the bearing hub 117 by the hub support ribs 146 which are conveniently formed as an integral part of said hub 117. As best shown in the inverted plan view Fig. 10, the outer ends of the ribs 146 are bifurcated and arcuate concentrically with the cup cylinders 28. It is to be noted that the ribs 146 are formed on radii running on a line from the axis of the bearing hub 117 to the center of the cup cylinders 28 and, hence, afford a maximum outlet port area, and the entire outlet flow from the cylinders 28 is carried downwardly through the outlet ports 145 formed around the hub bearing 117 to the chamber 30. Such construction accomplishes the purging of possible entrained air and water from the outlet cavities; gives maximum outlet passageway area around the hub; provides maximum strength; and permits of a minimum use of materials in a design suitable for die casting. As best shown in Fig. 3, the upper ends of said ribs 146 are provided with the notched portions 150 to facilitate the flow of fluid from the chamber 142 through the outlet ports 145. The meter body construction shown and described herein is described and claimed in my application Serial No. 651,447 filed March 2, 1946 which matured into Letters Patent No. 2,347,413 granted March 9, 1948 of which this application is a division.

As best shown in Fig. 4, the projection 155, of the inner valve section 125, in which the bearing 123 is formed for the pin 121, forms the driving pin for the drive shaft arm 156 which is rigidly fastened by means of a tapered pin 157 to the lower end of the drive shaft 158. Said drive shaft 158 is adapted to be connected at its upper end, by any convenient means, to a recording mechanism which registers the volume of fluid passed by the meter. Said drive shaft 158 is journalled in the bearing 159 fitted in a cylindrical opening formed in the top cover 1. I find it convenient to provide said drive shaft 158 with the spring loaded stuffing box 160, which may be of any of the well known constructions. The upper end of said shaft 158 is journalled in the closure cap 161 which is rigidly connected by means of a series of screws 162 to the boss 163 formed at the top of the top cover 1.

Said valve is provided with a parallel motion mechanism, or "Scotch yoke," to maintain parallel at all times each outer straight side of the valve section 122 with the outer straight side of the respective valve port 26 controlled. As best shown in Fig. 10, the valve section 122 is provided at each of its four corners with guide lugs 170. The valve yoke 171 is formed as a flat plate and is provided with the oppositely extending arms 172, and has a central opening 173 within the body portion. As best shown in Fig. 4, the drive shaft arm 156 is engaged with the projection 155 of the valve assembly. Said drive shaft arm 156 is positioned within the central opening 173 with clearance between said drive shaft arm 156 and the periphery of the central opening 173. The movement of the valve is restricted to a predetermined path of travel, as hereafter described, by the valve yoke 171 co-acting with the lugs 170 and because the path of movement of the arms 172 is limited by the guide brackets 175 in which said arms 172 are mounted.

The oppositely extending arms 172 of the valve yoke 171 are respectively mounted in the guide brackets 175 which are rigidly fastened, by means of a series of screws 176, to the top wall 24 of the body casing 2. The brackets 175 are provided with a U-shaped guide channel 177 in which an arm 172 is mounted with freedom of reciprocatory movement. Said arms 172 are retained conveniently within said U-shaped guide channels 177 by means of a pin 178 which extends through the opposite side walls of the U-shaped channel 177 and overlies the arm 172, as best shown in Fig. 3. In view of the fact that the arms 172 of the yoke 171 are held in sliding engagement in the guide channels 177 of the fixed brackets 175, movement of the yoke 171 is limited to a horizontal movement on an axis coinciding with the lines 3—3 in Fig. 1. As movement of said yoke 171 is thus limited, movement of the valve (effected by the crank pin 121 journalled in the bearing 123 of the projection 155) is limited to a path of travel in which each outer straight side of the valve section 122 is at all times parallel to the outer straight side of its respective controlled valve port opening 26.

Figure 2:
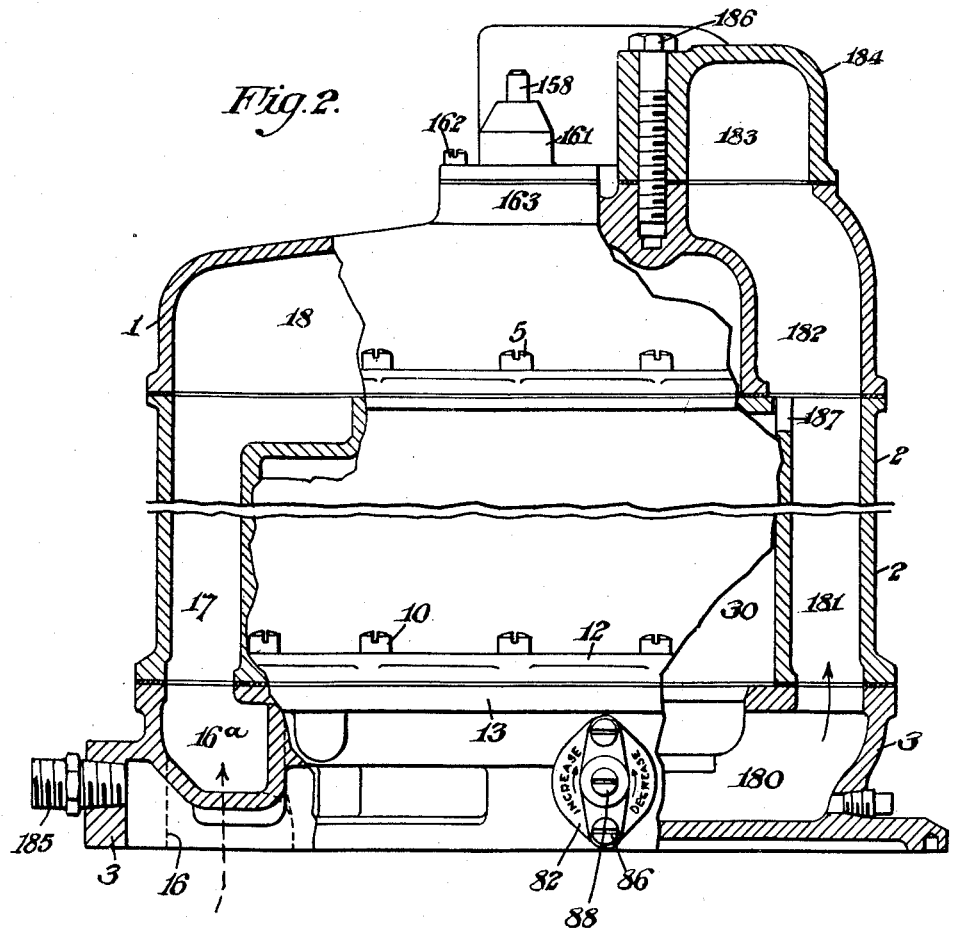
Fig. 2 is a vertical sectional view, partly in elevation, taken on the lines 2—2 in Fig. 1.
Figure 7:
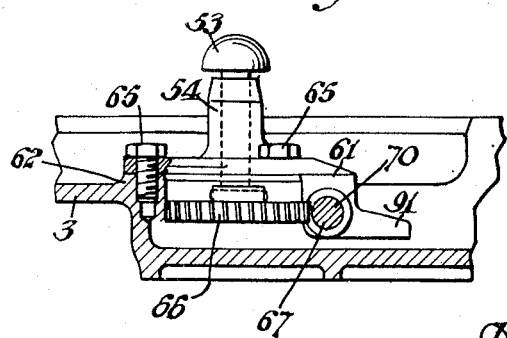
Fig. 7 is a fragmentary vertical sectional view, partly in elevation, of the bottom closure shown in Fig. 5, and taken on the same line of section as Fig. 2.

As best shown in Fig. 2, the chamber 30 is in open communication with the outlet passageway 180 formed in the bottom closure 3. Said outlet passageway 180 is in open communication with the outlet passageway 181 formed in the body casing 2, the outlet passageway 182 formed in the top cover 1, and the passageway 183 formed in the meter outlet cap 184. The meter outlet cap 184 is secured to the top of the top cover by means of a series of screws 186, one of which is shown in Fig. 2. The outlet passageway 183 is adapted to be connected to a conduit through which the fluid passed by the meter is dispensed. As best shown in Fig. 2, the outlet passageway 181 is in restricted open communication with the chamber 30 through the communicating passageway 187 formed in the wall at the top of the chamber 30. Communication between the top of said outlet passageway 181 and the top of the chamber 30 is desirable to carry off any air with the outgoing liquid, so as to displace quickly all of the air in the meter body when it is placed in service. If it were not for such communication between the outlet passageway 181 and the chamber 30, a certain amount of air would be entrapped between the cylinder cups 28 and the body casing 2 for a considerable period of time before such air would be absorbed by the liquid. Entrapment of air would be objectionable because of alternate compression and expansion of such air during operation of the meter, depending upon the time elapsing between the closing of the dispensing nozzle valve in consecutive deliveries, and such alternate compression and reexpansion of air would result in variations in the recorded delivery of the meter.

The operation of the meter shown and described herein is fully described in said Letters Patent No. 2,437,413 granted to me March 9, 1948.

It is obvious that various modifications may be made in my invention without departing from the essential features thereof as defined in the appended claims and, therefore, I do not wish to limit myself to the precise details of construction and arrangement herein set forth.

I claim:

In a meter of the nutating type; the combination of a wabble plate having a plurality of recesses formed at the periphery thereof; and a plurality of wedge-shaped stabilizing members projecting from a track member, adapted to be engaged and disengaged by said recesses intermittently in a continuous cycle during normal operation of said meter.

DAVID S. WILLSON.

REFERENCES CITED

The following references are of record in the file of this patent:

UNITED STATES PATENTS

| Number | Name | Date |
| --- | --- | --- |
| 1,966,619 | Fick | July 17, 1934 |
| 1,985,400 | Blum | Dec. 25, 1934 |
| 2,040,390 | Loe | May 12, 1936 |
| 2,106,236 | Burke | Jan. 25, 1938 |